(12) United States Patent
Kronhaus et al.

(10) Patent No.: US 11,781,536 B2
(45) Date of Patent: Oct. 10, 2023

(54) IGNITION PROCESS FOR NARROW CHANNEL HALL THRUSTER

(71) Applicant: TECHNION RESEARCH & DEVELOPMENT FOUNDATION LIMITED, Haifa (IL)

(72) Inventors: Igal Kronhaus, Haifa (IL); Abraham Warshavsky, Haifa (IL)

(73) Assignee: TECHNION RESEARCH & DEVELOPMENT FOUNDATION LTD., Haifa (IL)

( * ) Notice: Subject to any disclaimer, the term of this patent is extended or adjusted under 35 U.S.C. 154(b) by 0 days.

(21) Appl. No.: 16/770,071

(22) PCT Filed: Dec. 13, 2018

(86) PCT No.: PCT/IL2018/051353
§ 371 (c)(1),
(2) Date: Jun. 5, 2020

(87) PCT Pub. No.: WO2019/116371
PCT Pub. Date: Jun. 20, 2019

(65) Prior Publication Data
US 2021/0010463 A1   Jan. 14, 2021

(30) Foreign Application Priority Data
Dec. 14, 2017 (IL) .......................... 256341

(51) Int. Cl.
*F03H 1/00* (2006.01)
*H05H 1/54* (2006.01)
*B64G 1/40* (2006.01)

(52) U.S. Cl.
CPC ......... *F03H 1/0075* (2013.01); *F03H 1/0012* (2013.01); *H05H 1/54* (2013.01); *B64G 1/405* (2013.01)

(58) Field of Classification Search
CPC ................... F03H 1/0018; F03H 1/0062–0075
See application file for complete search history.

(56) References Cited

U.S. PATENT DOCUMENTS

| 5,763,989 A | 6/1998 | Kaufman |
| 5,798,602 A | 8/1998 | Gopanchuk et al. |

(Continued)

OTHER PUBLICATIONS

Khayms "Design of a Miniaturized Hall Thruster for Microsatellites" (Year: 1996).*
Extended European Search Report for EP Application No. 18888150.2, dated Aug. 3, 2021 (8 pages).
Khayms Vadim et al. Design of a Miniaturized Hall Thruster for Microsatellites, 1996, American Institute of Aeronatutics and Astronautics, Inc.

(Continued)

*Primary Examiner* — Arun Goyal
*Assistant Examiner* — William L Breazeal
(74) *Attorney, Agent, or Firm* — Daniel Feigelson

(57) ABSTRACT

Disclosed is a closed drift, narrow channel Hall thruster configured to operate at powers <30 W. The thruster includes a thruster body and a neutralizing cathode. The thruster body includes a magnetic circuit including a magnetic source and two magnetic poles, a metallic, annular thruster channel formed by the magnetic poles with a downstream channel width smaller than about 3 mm and an upstream channel width greater than the downstream channel width, an anode positioned at the channel's entry, and a gas distributor configured to release a propellant gas into the thruster channel. The magnetic circuit is configured to generate a magnetic field in the thruster channel for trapping electrons therein. The channel walls (the magnetic poles) are under bias potential. The anode and the cathode are configured to generate a substantially axial electric field in the thruster channel. In operation, propellant gas atoms ionized by trapped electrons in the thruster channel, accelerate axially, exiting via the channel's exit.

22 Claims, 5 Drawing Sheets

(56) References Cited

U.S. PATENT DOCUMENTS

| | | | |
|---|---|---|---|
| 6,150,764 | A | 11/2000 | Hruby et al. |
| 6,448,721 | B2 | 9/2002 | Raitses et al. |
| 6,612,105 | B1 | 9/2003 | Voigt et al. |
| 7,259,378 | B2 | 4/2007 | Madocks |
| 8,407,979 | B1 * | 4/2013 | Hofer .................. F03H 1/0075 60/202 |
| 3,613,188 | A1 | 12/2013 | Stein |
| 2002/0008455 | A1 * | 1/2002 | Fisch ...................... H05H 1/54 313/359.1 |
| 2002/0145389 | A1 | 10/2002 | Bugirova |
| 2005/0035731 | A1 * | 2/2005 | Secheresse .......... F03H 1/0075 315/500 |
| 2005/0247885 | A1 | 11/2005 | Madocks |
| 2019/0309736 | A1 * | 10/2019 | Brotons .................. H03K 3/59 |

OTHER PUBLICATIONS

A.A. Shagayda and O.A. Gorshkov, "Hall-Thruster Scaling Laws", J. Propul. Power 29 (2), 466-474, 2013.

Kronhaus, "Analysis of Very-Low-Power ExB Discharge Seeded by Vacuum Arc Plasma", 34th International Electric Propulsion Conference, Hyogo-Kobe, Japan, Jul. 4-10, IEPC-2015-84, 2015.

D. Jelem et al., 2017, "Performance mapping and qualification of the IFM nano thruster FM for in orbit demonstration", 35th International Electric Propulsion Conf. (Atlanta, Georgia, USA) pp. 2017-2024.

E. Lee et al., "Scaling Approach for Sub-Kilowatt Hall- Effect Thrusters", Journal of Propulsion and Power, vol. 35, No. 4, pp. 1-7, Aug. 2019, DOI:10.2514/1.B37424.

* cited by examiner

IGNITION PROCESS FOR NARROW CHANNEL HALL THRUSTER

TECHNICAL FIELD

The present disclosure relates generally to the field of Hall thrusters.

BACKGROUND

Hall thrusters, also known as closed drift accelerators, are successful electric propulsion (EP) systems commonly used for spacecraft propulsion. Hall thrusters exhibit favorable properties, including electric efficiency of about 50%, high exhaust velocities in the range of 10-25 km/sec, and substantial thrust with a current density ~1000 A/m$^2$.

Usually, in a Hall thruster, a closed-path electron drift is induced within an annular channel in crossed electric and magnetic fields. A magnetic circuit generates a radial magnetic field, which effectively magnetizes the electrons, while ions remain unconfined. An axial electric field is generated by applying a potential difference between a backplate anode, which may also act as the gas distributor, and an external cathode (outside the channel). A propellant mass flow rate is selected to obtain efficient electron impact ionization, while maintaining a low ion-atom collision frequency in order to allow for free motion of ions in the channel.

The two conventional annular Hall thruster designs differ by the material composition of the channel walls. One type, wherein the channel walls are made from a ceramic material, is known as a magnetic-layer accelerator or a stationary plasma thruster (SPT). The other type, wherein the channel walls are made from metal, is known as a thruster with an anode-layer (TAL).

In SPT, energetic electrons coming from the acceleration region are absorbed by the ceramic walls, and low energy secondary electrons are emitted instead. This mechanism regulates the electron temperature permitting the existence of extended ionization and acceleration regions.

In TAL, the metal walls have low secondary electron emission which makes the electron temperature very high. The high temperature electrons introduce significant electric sheath effects, with much of the potential difference occurring in a short distance of the order of one electron orbit in the local magnetic field. This short distance is located near an anode potential electrode, hence the name "anode layer".

To reduce the cost of space missions there is a general trend towards spacecraft and component miniaturization. In particular, nanosatellites, miniaturized spacecraft less than 20 kg in mass (sometimes defined as less than 12 kg in mass), are envisioned to operate in a formation of several spacecrafts and therefore require propulsion capacity. For a nanosatellite. EP is preferred over chemical propulsion as it allows for large savings in propellant mass. However, nanosatellites can generate only a limited amount of power for the EP system, typically between 2 W for the smallest CubeSats and 30 W for the larger nanosatellite versions, using state-of-the-art solar panels.

Historically, Hall thrusters were designed to operate at power levels above 300 W. Scaling existing Hall thruster designs to lower operating power, using simple linear scaling laws, has proven to be difficult. Reports in the literature, for example [A. A. Shagayda and O. A. Gorshkov, "Hall-Thruster Scaling Laws", J. Propul. Power 29 (2), 466-474, 2013]1 indicate an electrical efficiency drop to 10% at power levels below 100 W. Thus, the use of Hall thrusters for nanosatellite propulsion has so far proven problematic, with no reports of successful operation of conventional annular Hall thrusters at powers below 50 W.

U.S. Pat. No. 5,763,989 to Kaufman discloses closed-drift ion sources of the magnetic-layer and anode-layer types, with both one-stage and two stage versions of the latter disclosed. Specific improvements include the use of a magnetically permeable insert in the closed drift region together with an effectively single source of magnetic field to facilitate the generation of a well-defined and localized magnetic field while, at the same time, permitting the placement of that magnetic field source at a location well removed from the hot discharge region. Such a configuration is also well suited to the use of a permanent magnet as the magnetic field source. In one embodiment, a baffle arrangement serves to distribute the ionizable gas uniformly circumferentially and decrease its pressure below the Paschen-law minimum before exposure to the anode potential.

U.S. Pat. No. 5,798,602 to Gopanchuk et al. discloses an accelerator which comprises a magnetic system, having an external magnetic pole and an internal magnetic pole which are interconnected by a magnetic circuit, an outer magnetic screen, an inner magnetic screen, a central magnetizing coil and external magnetizing coils. Besides, the accelerator has a discharge chamber comprising a concave anode encompassing magnetic force surfaces of an ionization zone, a sectional gas distributor, an inner side wall and an outer side wall, the internal surfaces whereof in the ionization zone are located at an angle to a longitudinal axis of the accelerator.

U.S. Pat. No. 6,150,764 to Hruby et al. discloses a tandem Hall field plasma accelerator with closed electron drift which includes a magnetic circuit having an inner pole and an outer pole and a magnetic field source and a discharge cavity disposed axially in tandem; the discharge cavity including an axially extending accelerator section defining an exit aperture between the inner and outer poles and a plenum section extending radially outwardly and upstream of the accelerator section and including an anode and a propellant injector. Also disclosed is the use of an electromagnetic coil which provides a magnetic field in a magnetic circuit and includes a multiple turn winding wound on an electrically conductive bobbin. The plasma discharge is connected electrically in series with the electromagnetic coil and a power source with a bobbin defining a single turn secondary coil winding on the magnetic circuit which reduces magnetic field fluctuations in the plasma discharge and reduces eddy currents and consequent heating of the magnetic circuit.

U.S. Pat. No. 6,448,721 to Raitses et al. discloses an apparatus and method for thrusting plasma, utilizing a Hall thruster with a cylindrical geometry, wherein ions are accelerated in substantially the axial direction. The apparatus is suitable for operation at low power. It employs small size thruster components, including a ceramic channel, with the center pole piece of the conventional annular design thruster eliminated or greatly reduced. Efficient operation is accomplished through magnetic fields with a substantial radial component. The propellant gas is ionized at an optimal location in the thruster. A further improvement is accomplished by segmented electrodes, which produce localized voltage drops within the thruster at optimally prescribed locations. The apparatus differs from a conventional Hall thruster, which has an annular geometry, not well suited to scaling to small size, because the small size for an annular design has a great deal of surface area relative to the volume.

U.S. Pat. No. 6,612,105 to Voigt et al. discloses a system for uniformly distributing propellant gas in a Hall-effect thruster (HET) which includes an anode and a porous material gas distributor (PMGD). The porous material may be porous metal or porous ceramic. Propellant gas is directed from a supply to the PMGD for distribution into a gas discharge region of the HET. The gas flows through the porous material of the PMGD and out of the PMGD's exit surface into the annular gas discharge region. The PMGD has an average pore size, pore density and thickness that are optimized to control the flow of the gas at the desired flow rate and distribution uniformity at a relatively short distance downstream from the PMGD. This feature allows HET to be short, significantly decreasing susceptibility to vibration problems encountered during vehicle launch. The PMGD can include a shield for preventing contaminants from traveling upstream from the gas discharge region from adhering to the porous metal. The shield may be integrated into the PMGD or be a separate shield. In addition, the shield may be perforated so as to allow gas to pass through the shield to further decrease the distance needed to achieve uniform gas distribution. Alternatively, the exit surface of the porous metal may be oriented to face perpendicularly from the gas discharge path out of the HET, which significantly reduces the probability of contaminants adhering to the exit surface.

There remains a need for low power and electrically efficient miniaturized Hall thrusters.

SUMMARY

Aspects of the disclosure, according to some embodiments thereof, relates to Hall thrusters. More specifically, but not exclusively, aspects of the disclosure, according to some embodiments thereof, relate to miniaturized Hall thrusters providing low thrust rocket propulsion (e.g. for nanosatellite trajectory correction).

As discussed above, Hall thrusters perform poorly in low power regimes. This may be due to low propellant utilization, i.e. the fraction of the propellant flow being ionized. The Hall thruster is an electrostatic accelerator. Therefore, the exhaust velocity is proportional to the square root of the discharge voltage. If the exhaust velocity is to be maintained at reduced power, the discharge current needs to be reduced proportionally. A lower current, in turn, implies the use of a lower propellant mass flow rate. This results in an increase in the ionization mean free path length and lower probability of atom ionization for a given channel length. Additionally, one has to consider plasma losses from ion-wall recombinations: When ions reach the walls, they lose part of their momentum and recombine to form neutrals. This process reduces the exhaust velocity and thrust. Moreover, the resulting gas atoms need to be ionized again.

The present disclosure addresses the above-listed problems by disclosing the design and operation of a very-low-power Hall thruster with a miniaturized channel geometry, following the theoretical consideration of a minimum power discharge chamber in Kronhaus ["Analysis of Very-Low-Power ExB Discharge Seeded by Vacuum Arc Plasma", 34th International Electric Propulsion Conference, Hyogo-Kobe, Japan, July 4-10, IEPC-2015-84, 2015]. The design of the narrow channel Hall thruster (NCHT) of the present disclosure does not follow simple linear scaling laws. In particular, the ratio of the channel width to mid-channel diameter in the NCHT may be set as low as 1/30 (or even lower), whereas it is typically set to about 1/6 (as in the SPT-100 Hall thruster). In the NCHT, a high propellant utilization fraction is obtained due to a uniform gas distribution system, strong localized magnetic and electric fields, and a narrow exit area to increase gas density in the ionization region. While the NCHT design may also be useful at moderate power, specifically, as a first stage in a double-staged configuration, it may be technologically indispensable for plasma generation and closed-drift acceleration at very low power.

The NCHT represents a different kind of an annular Hall thruster. According to some embodiments, the NCHT is characterized by (i) a very narrow and short channel (with respect to the thruster's diameter) with angled metallic walls under cathode potential that also serve as magnetic poles, and by (ii) an anode which is wider than the exit of the channel. Advantageously, the above configuration leads to a Hall thruster that can operate at very low power <30 W (thereby reducing the number of solar panels required), low mass flow rates <0.4 mg/s (thereby reducing the amount of propellant gas that must be carried), and low discharge voltages <100 V (thereby reducing the complexity of the power supply). This capability is indispensable in order to serve a nanosatellite propulsion system. Further, according to some such embodiments, the NCHT exhibits a thrust-to-power ratio of at least about 50 μN/W, which is comparable to the SPT-100 Hall thruster, and significantly higher as compared to other electric propulsion systems at the very low power level range. For example, the thrust-to-power ratio of field emission electric propulsion (FEEP) devices is ≈10 N/W [D. Jelem et al., 2017 "Performance mapping and qualification of the IFM nano thruster FM for in orbit demonstration" $35^{th}$ International Electric Propulsion Conf. (Atlanta, Georgia, USA) pp 2017-24].

Thus, according to an aspect of some embodiments, there is provided a closed-electron drift, narrow channel Hall thruster (NCHT). The NCHT includes a thruster body and a neutralizing cathode positioned externally thereto and configured for electron emission. The thruster body includes:

A magnetic circuit including a magnetic source and two magnetic poles.

An annular thruster channel formed by the magnetic poles and characterized by at least two widths: a downstream channel width of about 3 mm or less and an upstream channel width greater than the downstream channel width.

An anode positioned at or near a channel entry of the thruster channel.

A gas distributor configured to release a propellant gas into the thruster channel at or near the anode.

The magnetic circuit is configured to generate a magnetic field in the thruster channel configured to confine, or substantially confine, electrons there within. The anode and the cathode are configured to generate an electric field which is axial, or substantially axial, at least at or near a channel exit of the thruster channel (to this end, walls of the channel are maintained under bias electric potential with respect to an electric potential of the anode). In operation, propellant gas atoms which are ionized by closed-drift electrons in the thruster channel, accelerate downstream therein (the ions not being confined by the magnetic field) and exit via the channel exit, thereby producing thrust.

According to some embodiments, the anode has a width which is greater than the downstream channel width.

According to some embodiments, the downstream channel width may be defined by the width of the channel exit and the upstream channel width may be defined by the width of the channel entry.

According to some embodiments, the anode is annular.

According to some embodiments, the anode is mounted perpendicularly to the axial direction, such that a surface thereof, which faces the channel entry, is flat or substantially flat.

According to some embodiments, the generated magnetic field is radial, or substantially radial at or near the channel exit.

According to some embodiments, the thruster body further includes a discharge chamber, which includes the thruster channel. The discharge chamber is fluidly coupled to the outside of the thruster body via the thruster channel. The anode may be positioned within the discharge chamber. The upstream channel width may be smaller than a maximum width of a discharge chamber.

According to some embodiments, the walls of the thruster channel are metallic, and configured to be maintained at a potential of the cathode or slightly there above.

According to some embodiments, the magnetic circuit is further configured such that the generated magnetic field increases in strength towards the channel exit.

According to some embodiments, the upstream channel width is greater than the downstream channel width by a factor of about 3 at least.

According to some embodiments, the channel walls include sloping sections along which a width of the channel decreases from the upstream channel width to the downstream channel width.

According to some embodiments, the sloping sections are angled, defining respective slope angles which are acute.

According to some embodiments, the slope angles of the sloping sections are between about 20° and about 60°.

According to some embodiments, the sloping sections are curved.

According to some embodiments, the thruster channel includes a fixed-width section having a width comparable to, on the order of, or about equal to the downstream channel width and extending downstream from the sloping sections.

According to some embodiments, a length of the fixed-width section is no greater than about 1 mm.

According to some embodiments, a length of the thruster channel is no greater than about 4 mm.

According to some embodiments, the length of the thruster channel is no greater than about 2 mm.

According to some embodiments, the channel walls include an inner wall and an outer wall, and the thruster body includes a first external wall and a second external wall. The first external wall meets the inner wall at the channel exit and extends therefrom towards a central axis of the thruster body, and the second external wall meets the outer wall at the channel exit and extends therefrom away from the central axis. The first external wall and the inner wall define a first angle therebetween which may be acute, and the second external wall and the outer wall define a second angle therebetween which may be acute.

According to some embodiments, the first angle and the second angle are each about 60° or smaller.

According to some embodiments, the thruster channel tapers in the downstream direction, and wherein the first external wall and the second external wall define an exit region outside the channel exit, which tapers in the upstream direction.

According to some embodiments, the gas distributor is metallic (and made of a non-magnetic metal including e.g. titanium, stainless steel SS304, and/or stainless steel SS316), and configured to be maintained at the anode potential. Apart from a tip portion of the gas distributor, the gas distributor may be covered by insulating inserts.

According to some embodiments, a tip portion of the gas distributor is porous, being thereby configured for release of the propellant gas.

According to some embodiments, the anode is porous and forms the tip portion of the gas distributor.

According to some embodiments, the anode is positioned at a distance of no more than about 4 mm from the channel exit. According to some embodiments, the anode is positioned at a distance of no more than about 2 mm from the channel exit.

According to some embodiments, a position of the anode, or a position of a surface thereof, defines a position, or an axial position (i.e. axial coordinate) of the channel entry.

According to some embodiments, a ratio of the downstream channel width to a mid-channel diameter is about 1/15 or smaller. According to some embodiments, the ratio of the downstream channel width to the mid-channel diameter is about 1/30 or smaller.

According to some embodiments, the downstream channel width is about 2 mm or smaller. According to some embodiments, the downstream channel width is smaller about 1 mm or smaller.

According to some embodiments, the anode width is at least about 3 times the downstream channel width.

According to some embodiments, a diameter of the NCHT is about 3 cm.

According to some embodiments, the magnetic circuit includes a single magnetic source.

According to some embodiments, the magnetic source is an (electrically conductive) coil.

According to some embodiments, the magnetic source is a permanent magnet.

According to some embodiments, the NCHT is configured to operate under a potential difference of about 100 V or less between the anode and the cathode.

According to some embodiments, the NCHT is configured to be functionally associated with at least one power supply which is configured to establish the potential difference between the anode and the cathode.

According to some embodiments, the NCHT is configured to operate at a power of about 30 W or less.

According to some embodiments, the NCHT is configured to be operated in a double-staged mode.

According to some embodiments, the thruster body is covered/coated by an insulator.

According to some embodiments, the insulator is ceramic.

According to some embodiments, the propellant gas is xenon, krypton, iodine, argon, and/or a combination thereof. According to some embodiments, the propellant gas may be metallic or include one or more gases of volatile metallic elements (for example, cesium).

According to some embodiments, the NCHT is configured to operate, or is further configured to operate, as an air-breathing Hall thruster.

According to some embodiments, the cathode is a thermionic cathode, a hollow cathode, a field emission cathode, or a radiofrequency/microwave cathode.

According to some embodiments, the gas distributor is configured to provide a uniform flow of the propellant gas in the thruster channel.

According to some embodiments, the NCHT weighs less than about 300 grams.

According to some embodiments, the walls of the thruster channel are metallic, and configured to be maintained at an intermediate potential between a potential of the cathode and the potential of the anode.

According to some embodiments, the NCHT is configured to propel a nanosatellite.

According to an aspect of some embodiments, there is provided a nanosatellite including a NCHT as described above.

According to an aspect of some embodiments, there is provided a method allowing to operate a closed-electron drift. NCHT at a low power. The method includes the steps of:

Providing a NCHT as described above.
Utilizing a power supply of about 30 W or less.
Establishing a discharge voltage across the cathode and anode such as to induce a closed-electron drift in the thruster channel; and
Releasing a propellant gas into the thruster channel, such as to produce a plasma by collisions with the closed-drift electrons, wherein plasma ions accelerate downstream therein and exit via the channel exit, thereby inducing a discharge producing a thrust at a thrust-to-power ratio of at least about 50 µN/W.

According to some embodiments, wherein the magnetic source is a conducting coil, the step of establishing the discharge voltage further includes inducing a current through the coil, thereby generating the magnetic field in the thruster channel.

According to some embodiments, in the step of establishing the discharge voltage, an axial, or substantially axial, electric field is generated in the thruster channel, at least at or near the channel exit.

According to some embodiments, the step of establishing the discharge voltage includes a first sub-step of establishing an initial voltage to ignite the discharge, and a second sub-step, following the step of releasing the propellant gas, of lowering the initial voltage to obtain the discharge voltage.

According to an aspect of some embodiments, there is provided a method for manufacturing a nanosatellite powered by a closed-electron drift, NCHT. The method includes the steps of:

Providing a satellite body portion and a NCHT as described above.
Mounting the NCHT on the satellite body portion, thereby assembling the nanosatellite.

According to some embodiments, the nanosatellite weighs no more than about 12 kg.

According to some embodiments, the nanosatellite is a CubeSat.

According to some embodiments, the gas distributor of the NCHT is manufactured by 3D printing (using e.g. titanium, stainless steel SS304, and/or stainless steel SS316).

According to some embodiments, wherein the gas distributor includes one or more porous rings and a baffle, the gas distributor is manufactured by welding the porous rings to the baffle (the porous rings and the baffle may be made of non-magnetic metals, e.g. titanium, stainless steel SS304, and/or stainless steel SS316).

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not to scale.

In the figures.

DETAILED DESCRIPTION

Figure 1A:
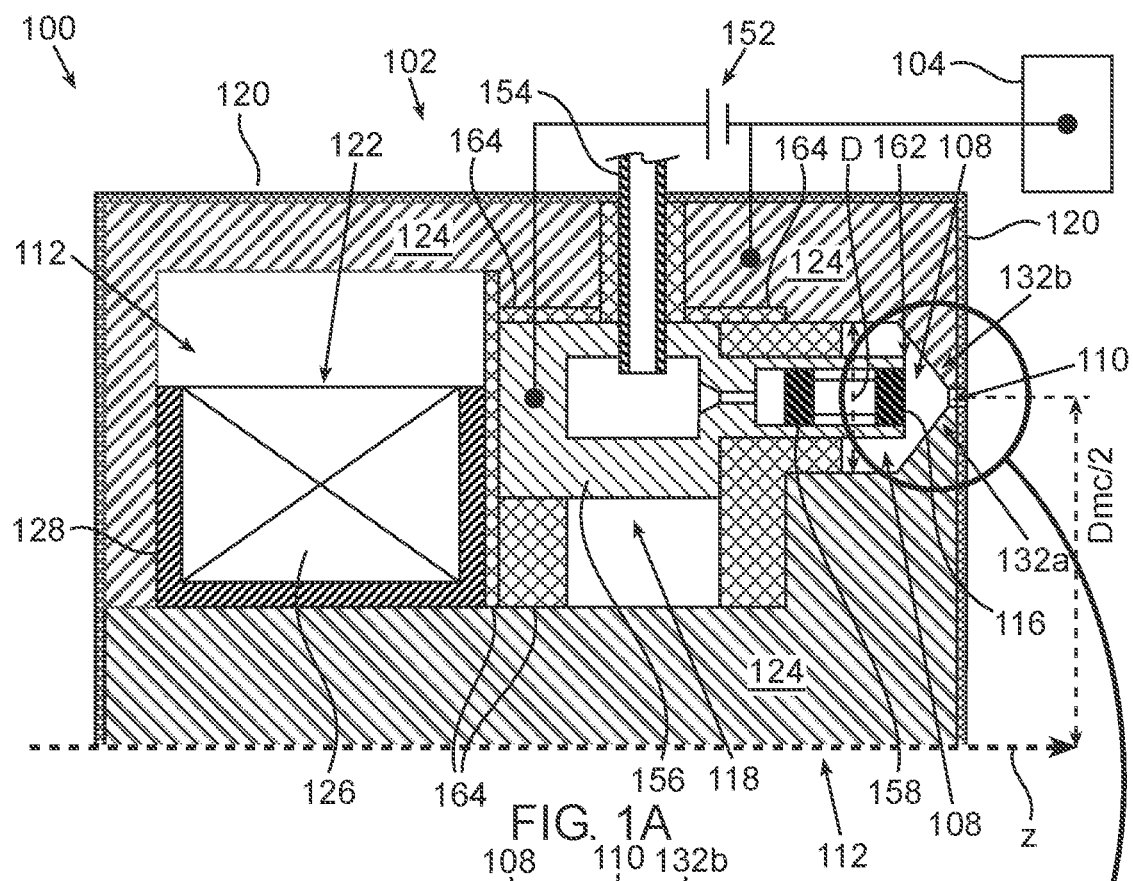
FIG. 1A is a schematic cross-sectional view of a closed electron-drift, narrow channel Hall thruster, according to some embodiments.

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the description and claims of the application, the words "include" and "have", and forms thereof, are not limited to members in a list with which the words may be associated.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, according to some embodiments, the terms "substantially" and "about" may be interchangeable.

As used herein, according to some embodiments, the terms "slightly smaller than", "slightly less than", and the like, with reference to the values of two parameters, may specify the value of the first (i.e. the smaller parameter) parameter to be smaller than that of the second parameter by no more than 20% of the value of the second parameter. Thus, for example, the statement "a is slightly smaller than b" is equivalent to the statement "0.8·b≤a<b". According to some embodiments, the term "slightly smaller than" may specify the value of the first parameter to be smaller than that of the second parameter by no more than 10% of the value of the second parameter. According to some embodiments, the term "slightly smaller than" may specify the value of the first parameter to be smaller than that of the second parameter by no more than 5% of the value of the second parameter.

The terms "slightly greater than", "slightly above", and the like, may similarly be defined. That is, according to some embodiments, the statement "a is slightly greater than b" is equivalent to the statement "b≤a<1.2·b". According to some embodiments, the statement "a is slightly greater than b" is equivalent to the statement "b≤a<1.1·b". According to some embodiments, the statement "a is slightly greater than b" is equivalent to the statement "b≤a<1.05·b".

As used herein, according to some embodiments, the term "comparable", with reference to two quantities, specifies that two quantities differ in magnitude by a factor of 3 at most. According to some embodiments, "comparable" specifies that two quantities differ in magnitude by a factor of 2 at most.

As used herein, according to some embodiments, the term "on the order of", with reference to a parameter and a stated numerical value, specifies that the value of the parameter is between half of the stated numerical value to twice the stated numerical value.

Systems and Methods

FIG. 1A is a schematic cross-sectional view of a closed electron-drift, narrow channel Hall thruster (NCHT) 100, according to some embodiments. More precisely, only a top half of NCHT 100 is depicted in FIG. 1, as up to some components, such as gas delivery tubes, the top half (shown) and bottom half (not shown), may be symmetric (i.e. displaying mirror symmetry about the z-axis) or substantially symmetric. According to some embodiments, up to some components (as mentioned above), NCHT 100 may be symmetric under rotations about the z-axis. As used herein, according to some embodiments, the terms "z-axis" and "central axis", with reference to a NCHT (such as NCHT 100), are interchangeable. As used herein, according to some embodiments, the term "radial" may specify a direction along any one of the straight lines extending from the z-axis and perpendicular to the z-axis, and in accordance with the standard definition of a cylindrical coordinate system.

Figure 1B:
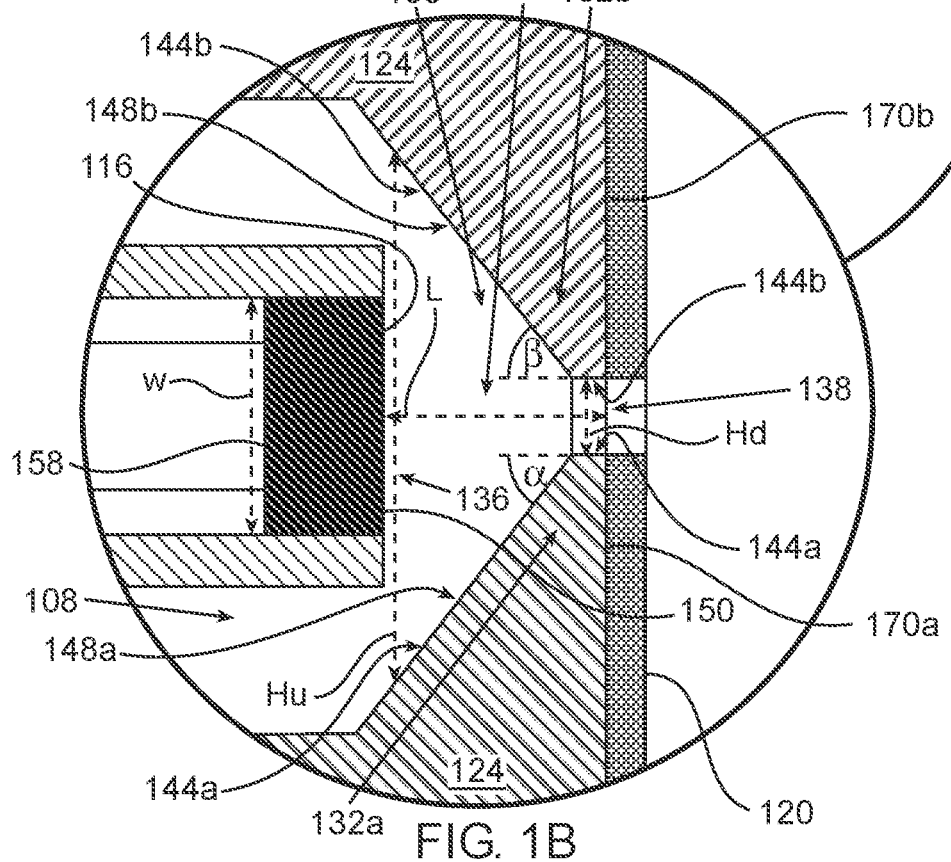
FIG. 1B is a schematic cross-sectional view of a discharge chamber and a thruster channel of the narrow channel Hall thruster of FIG. 1A, according to some embodiments.

NCHT 100 includes a thruster body 102 and an external, neutralizing cathode 104 configured for electron emission and positioned outside of thruster body 102. Thruster body 102 defines therein a discharge chamber 108 and an annular, or substantially annular, thruster channel 110, which forms a part of discharge chamber 108, and fluidly couples discharge chamber 108 to the outside of thruster body 102. According to some embodiments, not depicted in the figures, discharge chamber 108 is or consists of thruster channel 110. A maximum discharge chamber width D (i.e. the maximum width of the discharge chamber) is indicated in FIG. 1A. FIG. 1B provides a close-up view of thruster channel 110, according to some embodiments. Thruster body 102 further includes a magnetic circuit 112, an anode 116, which is electrically associated with cathode 104 (as detailed below), and a gas distributor 118. According to some embodiments, and as depicted in the figures, thruster body 102 includes an insulator(s) 120, such as a thin ceramic coating, which covers thruster body 102 and functions to prevent short circuit or power loss between cathode 104 and thruster body 102. Cathode 104 may be a thermionic cathode (e.g. a tungsten filament), a hollow cathode, a field emission cathode, or a radiofrequency/microwave cathode.

Magnetic circuit 112 includes a magnetic source 122, a magnetic material 124 (e.g. a ferromagnet), and a pair of opposite magnetic poles 132. According to some embodiments, and as depicted in the figures, magnetic source 122 is a conducting coil 126 (e.g. winded around a section of magnetic material 124 such that magnetic material 124 is magnetized by coil 126 when an electrical current is induced through coil 126). According to some such embodiments, coil 126 is wounded about a bobbin 128. According to some alternative embodiments, not depicted in the figures, magnetic source 122 is permanent magnet. Magnetic poles 132 include an inner pole 132a and an outer pole 132b, as detailed below. Magnetic poles 132, or at least a portion thereof, are electrically conducting, as elaborated on below.

Thruster channel 110 extends from a channel entry 136 (entrance) to a channel exit 138 and includes an inner wall 144a and an outer wall 144b (indicated in FIG. 1B). Thruster channel 110 is characterized by at least two widths (defined by channel walls 144): a downstream channel width Hd and an upstream channel width Hu greater than the downstream channel width Hd (i.e. Hu>Hd). According to some embodiments, the upstream channel width Hu corresponds to the maximum width of thruster channel 110 (e.g. at channel entry 136) and the downstream channel width Hd corresponds to the minimum width of thruster channel 110 (e.g. at channel exit 138). For example, as shown in FIG. 1B, the axial position of channel entry 136 is defined by anode 116 or the axial coordinate (z coordinate) of anode 116. A length L (shown in FIG. 1B) of thruster channel 110 may be defined as the distance between channel entry 136 and channel exit 138. According to some embodiments, the discharge chamber maximum width D is greater than the upstream channel width Hu (i.e. D>Hu), and, in particular, the width of channel entry 136. Channel widths Hd and Hu are indicated in FIG. 1B. According to some embodiments, thruster channel 110 includes a fixed-width section 146 (indicated in FIG. 1C) having the downstream channel width Hd and extending from channel exit 138 into thruster channel 110 (i.e. extending in the direction of the negative z-axis from channel exit 138) between poles 132.

According to some embodiments, inner wall 144a and outer wall 144b are made of, or include, a soft magnetic metal (steel AISI-1020, steel SAE-1018, stainless steel SS430, and the like).

A mid-channel diameter Dmc of thruster body 102 extends from a mid-point of channel exit 138 to an opposite mid-point thereof through the z-axis (i.e. the central axis of thruster body 102).

According to some embodiments, the mid-channel diameter Dmc is greater by a factor of at least 15 than the width of channel exit 138/the downstream channel width Hd. According to some embodiments, the Dmc to Hd ratio (i.e. Dmc/Hd) is about 20 or greater. According to some embodiments, the Dmc to Hd ratio is about 30 or greater. It is noted that in contrast in the SPT-100 Hall thruster the magnitude of the Dmc to Hd ratio is set to about 6). According to some embodiments, Hd measures about 1 mm and the (total) diameter of thruster body 102 is about 3 cm.

According to some embodiments, and as depicted in the figures, inner wall 144a includes a first sloping section 148a (i.e. an oblique/slanted section of inner wall 144a) and outer wall 144b includes a second sloping section 148b (indicated in FIG. 1B). That is, thruster channel 110, or at least a portion thereof, is tapered (tapering in the downstream direction). According to some embodiments, first sloping section 148a and second sloping section 148b extend from channel entry 136 until fixed-width section 146, such that the width of thruster channel 110 decreases there along from Hu to Hd.

According to some embodiments, not depicted in FIGS. 1A-IC, thruster channel 110 does not include fixed width section 146, so that first sloping section 148a extends all along inner wall 144a, and second sloping section 148b extends all along outer wall 144b.

As used herein, according to some embodiments, the terms "upstream" and "downstream", for example, with reference to an ionized (positive) current (discharge) through thruster channel 110, are defined relative to the flow direction of the ionized current, i.e. from the inside of thruster body 102 to the outside thereof, via thruster channel 110. Thus, for example, channel entry 136 is located upstream relative to channel exit 138.

According to some embodiments, the channel length L (of thruster channel 110) is comparable to the downstream channel width Hd. According to some embodiments, the channel length L is about equal to the downstream channel width Hd or slightly greater therefrom. In particular, the relative shortness of thruster channel 110 means that a substantial electric field within thruster channel 110 may be generated even at low discharge voltages <100 V (i.e. when the potential difference between anode 116 and cathode 104 is smaller than 100 V).

According to some embodiments, and as depicted in the figures, first sloping section 148a is set at a first slope angle $0°<\alpha<90°$ relative to the z-axis. Similarly, according to some embodiments, and as depicted in the figures, second sloping section 148b is set at a second slope angle $0°<\beta<90°$ relative to the z-axis. According to some embodiments, $\alpha$ and $\beta$ may range from about 20° to about 60°. According to some embodiments, $\alpha$ and $\beta$ are equal or substantially equal.

In operation, the sloping of channel walls 144, which decreases the width of thruster channel 110 in the axial direction (i.e. in the direction of increase of z), functions to impede flow of the propellant gas out of thruster channel 110, thereby increasing the propellant gas pressure and density, particularly in the vicinity of channel exit 138.

According to some embodiments, one or more of sloping sections 148 (i.e. first sloping section 148a and second sloping section 148b) is curved. According to some embodiments, one or more of sloping sections 148 includes, or is in the form of, one or more steps.

Figure 1C:
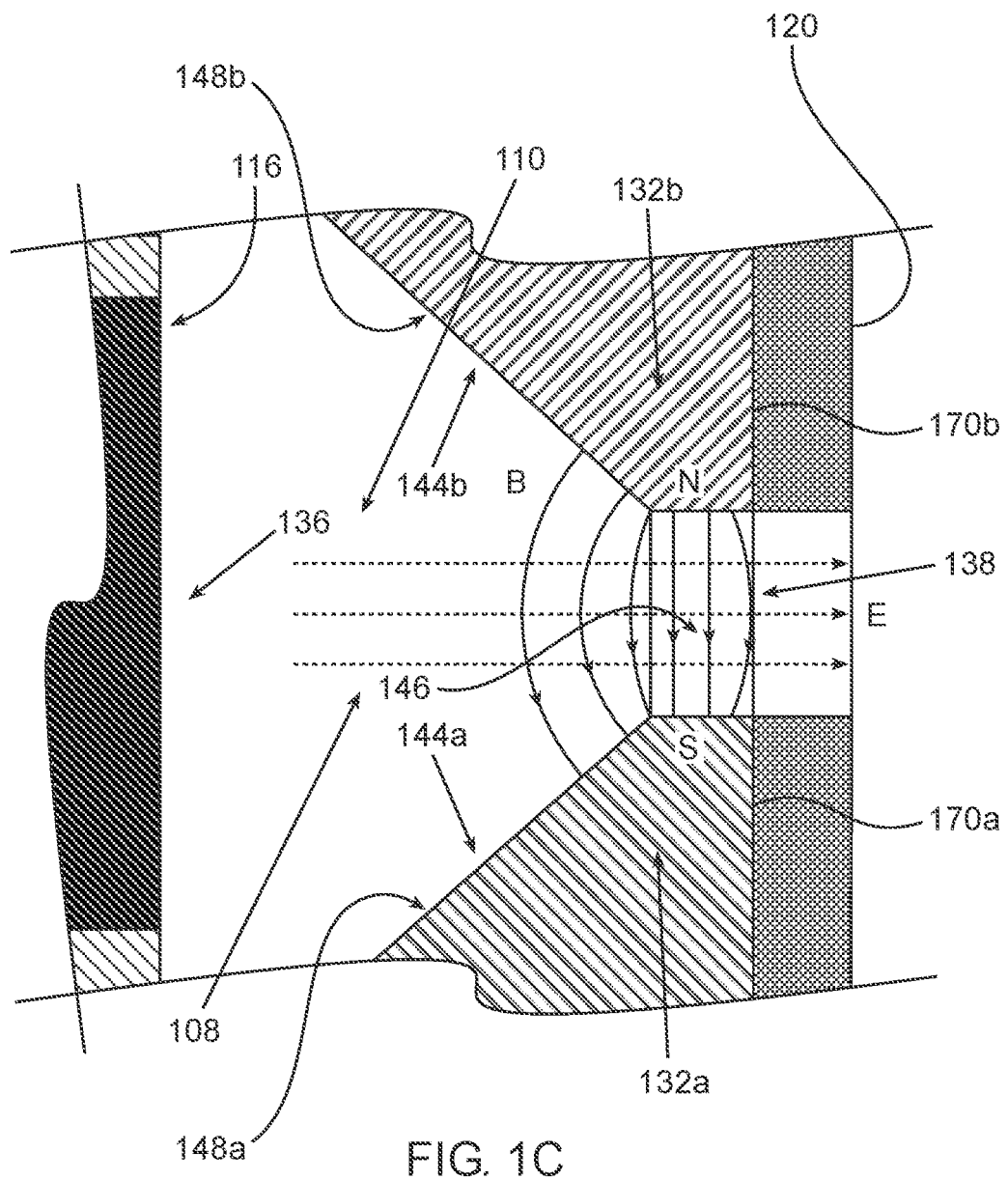
FIG. 1C schematically depicts crossed electric and magnetic fields in the thruster channel of FIG. 1B when the narrow channel Hall thruster is in operation, according to some embodiments.

Inner wall 144a and outer wall 144b constitute a part of magnetic poles 132 with inner pole 132a forming at least a part of inner wall 144a and outer pole 132b forming at least a part of outer wall 144b. According to some embodiments, inner pole 132a and outer pole 132b are configured to form a radial, or substantially radial, magnetic field there between (i.e. pointing from one of channel walls 144 to the other), as shown in FIG. 1C.

Anode 116 may be positioned at or near channel entry 136 (of thruster channel 110). According to some embodiments, the position of anode 116 (i.e. the location thereof along the z-axis) defines channel entry 136 (i.e. the location thereof along the z-axis). According to some embodiments, anode 116 is annular (e.g. in the form of an annular plate) and may be mounted perpendicularly to the axial direction (defined by the z-axis). According to some embodiments, a width w (indicated in FIG. 1B) of anode 116 is greater than the downstream channel width Hd. (The anode width w may be bounded from above by the upstream channel width Hu.) According to some embodiments, a surface 150 of anode 116—anode surface 150 facing channel exit 138 (i.e. being perpendicular or substantially perpendicular to the z-axis)—is flat or substantially flat. According to some embodiments, the area of anode surface 150 is approximately $\pi \cdot Dmc \cdot w$. Increasing the anode width w (which beyond a certain extent may require increasing the sloping of channel walls 144 such as to increase the upstream channel width Hu), increases the area of anode surface 150, which in turn may increase the contact area between anode surface 150 and plasma generated in thruster channel 110 (after NCHT 100 has been operated). According to some embodiments, to reduce the near anode potential drop and maintain most of the potential drop near the channel exit 138 (channel exit plane), thereby reducing ion losses to the channel walls and increasing the generated thrust, the anode width should be greater by a factor of about 2, or about 3, than the width of channel exit 138 (e.g. w>Hd).

According to some embodiments, anode surface 150 defines the position, or the axial position, of channel entry 136. In particular, according to some embodiments, the walls (which may be in part sloped) of discharge chamber 108 before (upstream to) channel entry 136 (i.e. the walls characterized by z coordinates smaller than that of anode surface 150), do not form part of channel walls 144 (and sloping sections 148), even though they form a continuation of channel walls 144.

According to some embodiments, the channel length L (i.e. the distance from channel 138 to anode 116) measures between about 2 mm and about 4 mm. According to some such embodiments, the channel length L is greater by a factor of about 2, about 3, about 4, or even about 5 or more, than the length of fixed-width section 146 (i.e. the distance from channel exit 138 to sloping sections 148). Each possibility is a separate embodiment. According to some embodiments, the length of fixed-width section 146 measures between about 0.5 mm and about 1 mm.

Anode 116 and cathode 104 are electrically associated with a power supply 152 (e.g. outside thruster body 102), which is configured to establish a potential difference there between (which defines the total accelerating voltage of the ions). According to some embodiments, channel walls 144 are under bias (electric) potential with respect to an (electric) potential of anode 116. More specifically, anode 116, cathode 104, and thruster channel 110 are configured such that the application of a potential difference between anode 116 and cathode 104 gives rise to an axial, or substantially axial, electric field along thruster channel 110, or at least in fixed-width section 146. According to some embodiments, the positive terminal of power supply 152 is connected to anode 116 and the negative terminal is connected to channel walls 144 and cathode 104, such that channel walls 144 are maintained under cathode 104 potential.

Anode 116 may be made of a non-magnetic metal such as titanium, stainless steel SS304, and/or stainless steel SS316.

According to some embodiments, the power supply may further be configured to induce electrical current via coil 126, or another power supply (e.g. a rechargeable battery; not shown) may be used to this end.

According to some embodiments, inner wall 144a and outer wall 144b may be configured to be (voltage) biased with respect to cathode 104, such as to be maintained under an intermediate potential between the potentials of cathode 104 and anode 116. The biasing may be effected using an additional power supply (not shown) between cathode 104 and thruster body 102. According to some such embodiments, NCHT 100 may be operated as a double-staged Hall thruster.

Gas distributor 118 is configured to release a propellant gas (e.g. xenon) into thruster channel 110 at or near anode 116. According to some embodiments, gas distributor 118 is configured to uniformly release the propellant gas into thruster channel 110. Gas distributor 118 includes a gas tube 154 and a baffle 156. Gas tube 154 is fluidly associated with an external gas tank (not shown) and leads to baffle 156. According to some embodiments, baffle 156 includes one or more porous rings 158 (the pores are not shown) wherethrough the propellant gas (arriving via gas tube 154) passes on the way to thruster channel 110. Porous rings 158 may function to uniformize the propellant gas flow. A tip portion 162 of gas distributor 118 may include one of porous rings 158.

According to some embodiments, anode 116 is porous (i.e. includes pores (not shown)) and is mounted on tip portion 162, such as to allow the release of the propellant gas through (the pores in) anode 116. According to some such embodiments, gas distributor 118 is metallic and functions as the anode (e.g. gas distributor 118 includes anode 116). In particular, gas distributor 118 may be maintained under anode potential. According to some such embodiments, apart from around tip portion 162, gas distributor 118 is surrounded by (insulating) inserts 164 (not all of which are numbered), which function to electrically insulate gas distributor 118 from channel walls 144 and magnetic circuit 112.

A first external wall 170a (indicated in FIGS. 1B and 1C) meets inner wall 144a at channel exit 138. First external wall 170a extends from channel exit 138 towards the z-axis. A second external wall 170b (indicated in FIGS. 1B and 1C) meets outer wall 144b at channel exit 138. Second external wall 170b extends from channel exit 138 away from the z-axis. External walls 170 are covered by insulator 120 (which, according to some embodiments, may have a thickness between about 0.1 mm and about 0.5 mm). According to some other embodiments, not depicted in FIGS. 1A-1C, first external wall 170a and second external wall 170b are sloped, essentially as described below in the description of FIG. 2.

According to some embodiments, not depicted in the figures, anode 116 does not form part of gas distributor 118. According to some such embodiments, wherein gas distributor 118 is metallic, gas distributor 118 may be maintained at floating potential. According to some other embodiments, gas distributor 118 is made of, or includes, a dielectric material.

According to some embodiments, not depicted in the figures, gas distributor 118 is a standard baffle system, as known in the art.

Cathode 104 is configured to emit electrons. More specifically, cathode 104 is configured such that electrons emitted therefrom neutralize the discharge current exiting thruster channel 110, as known in the art of Hall thrusters. According to some embodiments, cathode 104 may be positioned at a distance of about 1 cm from channel exit 138.

According to some embodiments, gas distributor 118 may include a plurality of gas tubes (at least one additional gas tube beyond gas tube 154). According to some embodiments, anode 116 is segmented.

In operation, crossed electric and magnetic fields are generated within thruster channel 110, such as to induce closed-drift motion of electrons in thruster channel 110, particularly, in the vicinity of channel exit 138. According to some embodiments, and as depicted in FIG. 1C, the strength of the magnetic field may be maximum in fixed-width section 146, where the magnetic field points radially or substantially radially (and the electric field is axial or substantially axial).

For a given propellant flow rate (i.e. the total mass of the gas propellant released by gas distributor 118 per unit time), the varying width of thruster channel 110 (which decreases towards channel exit 138) increases the propellant gas density in the region of high magnetic induction (in the vicinity of channel exit 138), leading to an increase in the ionization rate.

It is noted that the double function of channel walls 144 (i.e. inner wall 144a and outer wall 144b)—functioning both as magnetic poles and as electrodes—contributes to the miniaturization of NCHT 100. Since the channel walls are not electrically insulated from the magnetic poles. NCHT 100 may require fewer components, thereby further allowing to decrease the weight and dimensions of NCHT 100. Similarly, the use of a single magnetic source, particularly, a single magnetic coil, contributes to the reduction in weight and dimensions and may also reduce complexity.

As a concrete example, setting Hd=1 mm, Dmc=30 mm, L=2 mm, and assuming J=1000 A/m$^2$ (wherein J is the discharge current density), as in conventional Hall thrusters, and full propellant utilization, it can be shown that for a discharge voltage of 70 V, the expected thrust is about 1 mN, demonstrating the feasibility of NCHT 100.

Figure 2:
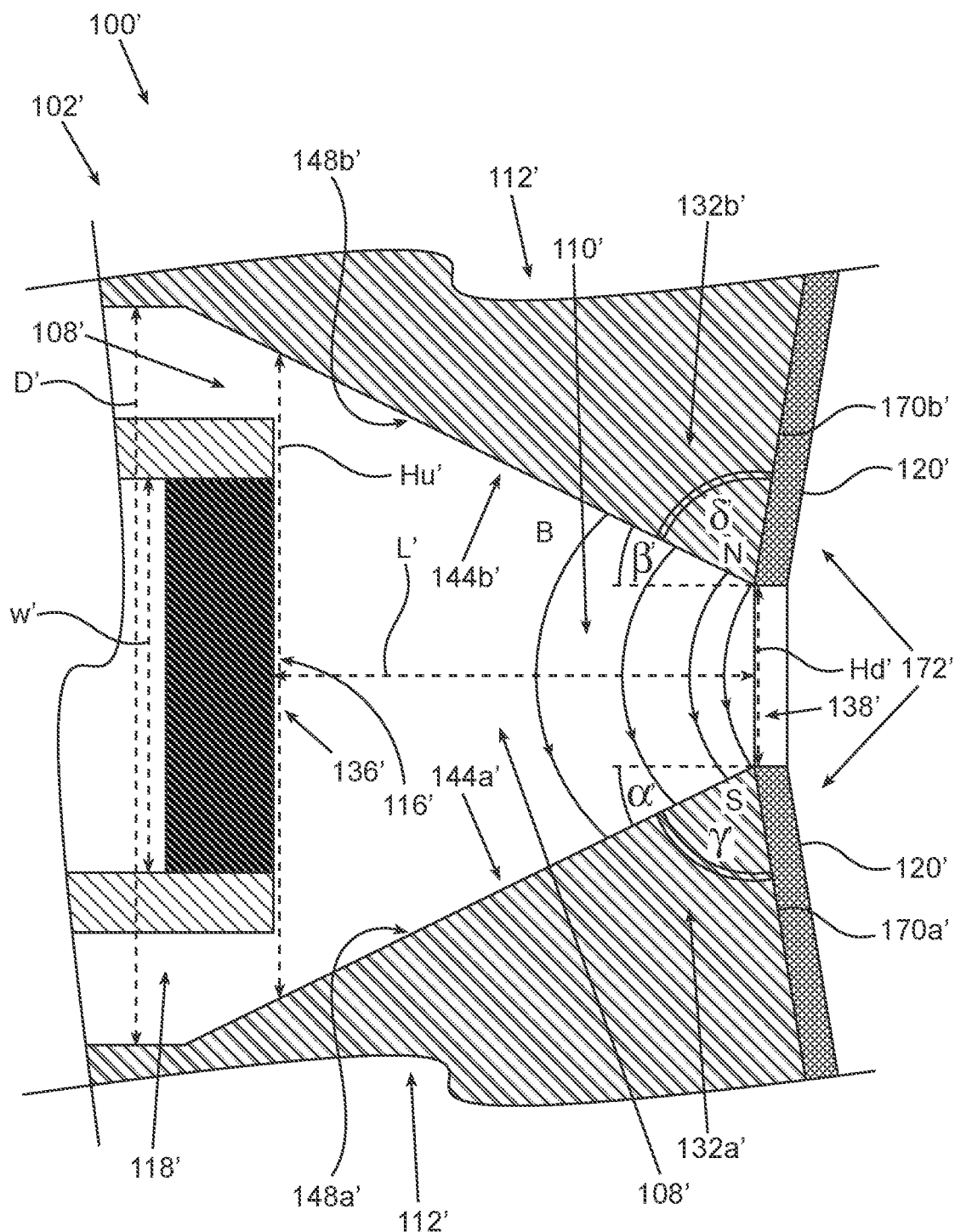
FIG. 2 is a schematic cross-sectional view of a discharge chamber and a thruster channel of a closed drift, narrow channel Hall thruster, according to some embodiments.

According to an aspect of some embodiments, and as schematically depicted in FIG. 2, there is provided a closed electron-drift NCHT 100'. NCHT 100' is a specific embodiment of NCHT 100. NCHT 100' includes a thruster channel 110' which does not include a fixed-width section (such as fixed-width section 146). NCHT 100' includes a thruster body 102', which is a specific embodiment of thruster body 102, and an external, neutralizing cathode (not shown), which is a specific embodiment of cathode 104.

More specifically, in addition to thruster channel 110', thruster body 102' includes a discharge chamber 108' (which includes thruster channel 110'), a magnetic circuit 112', an anode 116', a gas distributor 118', and an insulator(s) 120', which are specific embodiments of discharge chamber 108, magnetic circuit 112, anode 116, gas distributor 118, and insulator(s) 120, respectively.

Thruster channel 110' includes an inner wall 144a' and an outer wall 144b'. Since in a preferred embodiment of NCHT 100' does not include a fixed-width section, a first sloping section 148a' of inner wall 144a' extends all along the length of inner wall 144a' (i.e. sloping section 148a' extends from channel exit 138' until channel entry 136'). Similarly, a second sloping section 148b' of outer wall 144b' extends all along the length of outer wall 144b'. In particular, according to some embodiments, poles 132' (i.e. an inner pole 132s' and an outer pole 132b' of magnetic circuit 112'), are pointed (sharp), which may increase the density of the magnetic field lines therebetween.

Angles $\alpha'$ and $\beta'$ indicate the slope angles of inner wall 144a' and outer wall 144b', respectively. Hd', Hu', and L' indicate the downstream channel width, upstream channel width, and length, respectively, of thruster channel 110'. w' indicates the width of anode 116'. D' indicates the maximum width of discharge chamber 108'. The relative proportions of Hd', Hu', L', D', and w' may be similar to those of Hd, Hu, L, D, and w of NCHT 100. In particular, according to some embodiments, D'>Hu'>w'>Hd'. According to some embodiments, the mid-channel diameter (not indicated) of NCHT 100' is greater than Hd' by a factor of at least about 15. According to some embodiments, the mid-channel diameter of NCHT 100' is greater than Hd' by a factor of at least about 30. Also indicated are a channel entry 136' and a channel exit 138' of thruster channel 110'.

A first external wall 170a' extends from channel exit 138 towards the central axis (not shown in FIG. 2) of the NCHT 100'. A first external wall 170a' extends from channel exit 138 away from the central axis. According to some embodiments, first external wall 170a' and second external wall 170b' are also sloped. That is, external walls 170' are not perpendicular to the z-axis. External walls 170' are covered by insulator 120'. Inner wall 144a' and first external wall 170a' define an angle γ' therebetween. Outer wall 144b' and second external wall 170b' define an angle δ' therebetween. According to some embodiments, first external wall 170a' and second external wall 170b' of thruster body 102' are curved or include one or more steps.

According to some embodiments, first external wall 170a' is sloped such that 90°<α'+γ'<180 and second external wall 170b' is sloped such that 90°<β'+δ'<180°. (That is, inner wall 144a' and first external wall 170a' are sloped in opposite senses relative to the radial direction. Similarly, outer wall 144b' and second external wall 170b' are sloped in opposite senses relative to the radial direction.) It is noted that for α'<90° and β'<90° thruster channel 110' tapers in the downstream direction. For the above relations between α' and γ', and β' and δ', this implies that an exit region 172' (outside channel exit 138' and adjacent thereto and to the two portions of insulator 120' extending along external walls 170') tapers in the upstream direction (i.e. in the opposite direction to the tapering of thruster channel 110').

According to some embodiments, α' and β' may range from about 200 to about 60°, and γ' and δ' are smaller than about 60°, about 45°, or about 30°. Each possibility is a different embodiment. According to some embodiments, γ'<α' and δ'<β'. The above choices of angles may function to increase the density of the magnetic field lines between poles 132'.

Thus, according to an aspect of some embodiments, there is provided a narrow channel Hall thruster (NCHT), such as NCHT 100, NCHT 100', or similar thereto. The small dimensions of the thruster channel, in particular, the downstream channel width (e.g. Hd, Hd') measuring no more than about 2 mm (as opposed to, for example, about 12 mm in conventional annular Hall thrusters) or even no more than about 1 mm, and the channel length (e.g. L, L') being comparable to the downstream channel width, allows for generating relatively strong localized magnetic and electric fields in the thruster channel even at modest power P levels (e.g. <30 W) and discharge voltages $U_d$ (e.g. <100 V), thereby reducing the total size and weight of the NCHT (e.g. as less powerful and cumbersome power supply and magnetic circuits may be employed).

According to some such embodiments, the mid-channel diameter of the thruster body (e.g. thruster bodies 102 and 102') is about 40 mm, about 30 mm, about 25 mm, or even about 20 mm. According to some such embodiments, the total diameter of the thruster body is about 3 cm or even smaller and the thruster body may weigh about 300 grams or even about 200 grams.

According to some such embodiments. P can be as small as about 15 W and $U_d$ can be as small as about 60 V or even lower.

According to some such embodiments, the slope angles of the channel walls (e.g. a and β, α' and β') range from about 200 to about 60°, so that the upstream channel width—and the anode width (e.g. w, w')—can be greater than the downstream channel width by a factor of about 4 or even by a factor of about 8.

According to some such embodiments, the channel walls (which are formed by the magnetic poles and are metallic) are maintained at the cathode (e.g. cathode 104) potential, so that the acceleration zone is confined to a region near the channel exit/channel exit plane (e.g. channel exit 138).

According to some such embodiments, the magnetic field between the magnetic poles measures on the order of 1000 Gauss or about 1000 Gauss.

According to some such embodiments, the anode (e.g. anodes 116 and 116') is porous and located on a tip portion of the gas distributor (e.g. gas distributors 118 and 118') such that the anode is configured to release the propellant gas therethrough. The gas distributor may be metallic and kept at the anode potential.

According to some such embodiments, a surface of the anode (e.g. anode surface 150) facing the channel exit (e.g. channel exit 138) defines the position, or the z coordinate of the channel entry (e.g. channel entry 136).

According to some such embodiments, the mass flow rate $\dot{m}$ of the propellant (e.g. xenon, krypton, iodine, and/or argon gases) is lower than about 0.4 mg/s, about 0.3 mg/s, about 0.2, mg/s, or even about 0.15 mg/s. Each possibility is a separate embodiment.

According to some such embodiments, in operation, the resultant propellant utilization coefficient $\eta_p$ ($\eta_p=\dot{m}_i/\dot{m}$, wherein $\dot{m}_i$ is the ion mass flow rate) may be greater than about 0.25, greater than about 0.5, greater than about 0.75, or even close to 1 (i.e. full propellant utilization). Each possibility is a separate embodiment.

According to some such embodiments, in operation, the resultant thrust ranges from about 0.7 mN to about 1.6 mN or even to about 2 mN or greater. Each possibility is a separate embodiment. According to some such embodiments, in operation, the resultant thrust-to-power ratio can be as high as about 0.5 μN/W, as high as about 0.55 μN/W, or even as high about 0.6 μN/W or higher. Each possibility is a separate embodiment.

According to some such embodiments, in operation, the resultant discharge current $I_d$ ranges from about 0.2 A to about 0.45 A or even from about 0.15 A to about 0.5 A. Each possibility is a separate embodiment.

According to some such embodiments, each of the poles (e.g. poles 132a' and 132b') at the channel exit is sharp, in the sense that the meeting point between the respective wall of the thruster channel (e.g. walls 144a' and 144b', respectively) and the respective external wall (e.g. external walls 170a' and 170b', respectively) defines an acute angle (e.g. angles γ' and δ', respectively).

According to some such embodiments, the thruster channel (e.g. thruster channels 110 and 110') tapers in the downstream direction. According to some such embodiments, the exit region (e.g. exit region 172') outside the channel exit, tapers in the upstream direction.

Experimental Results

A 3 cm prototype of NCHT 100', according to some embodiments thereof, was built and tested at the Asher Space Research Institute (ASRI) in the Technion, Haifa, Israel. The experiments were performed in a low power regime P<45 W with a maximum discharge voltage of $U_d$<100 V and a discharge current of $I_d$<0.45 A. The magnetic field between the poles measured about 1000 Gauss. The prototype was further characterized by $\alpha=\beta=34°$, Hd=1 mm, Hu=6.5 mm, Dem=30 mm, L=2 mm, and a weight of about 300 grams.

Figure 3A:
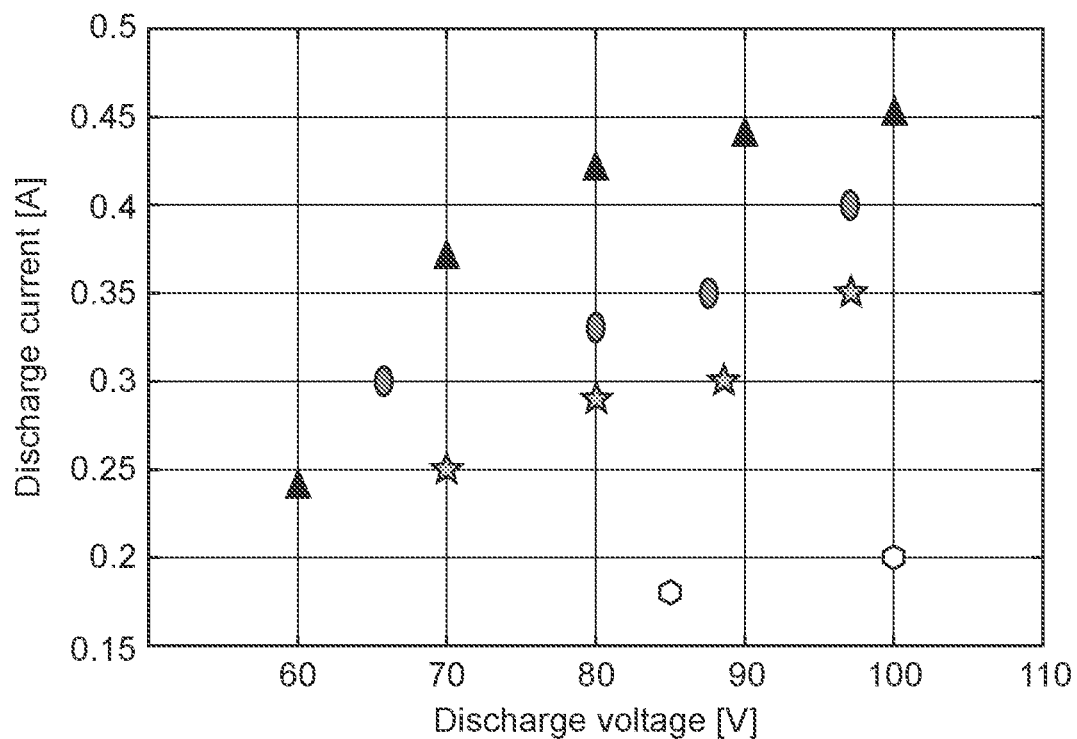
FIGS. 3A-3C present experimentally obtained results from tests conducted using a prototype of the narrow channel Hall thruster of FIG. 2, according to some embodiments thereof.

FIG. 3A displays the dependence of the discharge current $I_d$ on the discharge voltage $U_d$ for three (propellant) mass flow rates: $\dot{m}$=0.60 mg/s (triangles). $\dot{m}$=0.50 mg/s (ovals), and $\dot{m}$=0.38 mg/s (stars) at a coil current of ≈0.6 A. For all three mass flow rates, the discharge current is seen to monotonically increase as the discharge voltage is increased. The two data points (indicated by hexagons) were obtained at a mass flow rate of 0.38 mg/s but at a stronger magnetic field (coil current of 1 A). The increase in magnetic field strength is seen to result in a lower discharge current (for a given discharge voltage), hinting at the possibility of operating NCHT 100 at lower mass flow rates, e.g. as low as 0.2 mg/s or even lower.

Figure 3B:
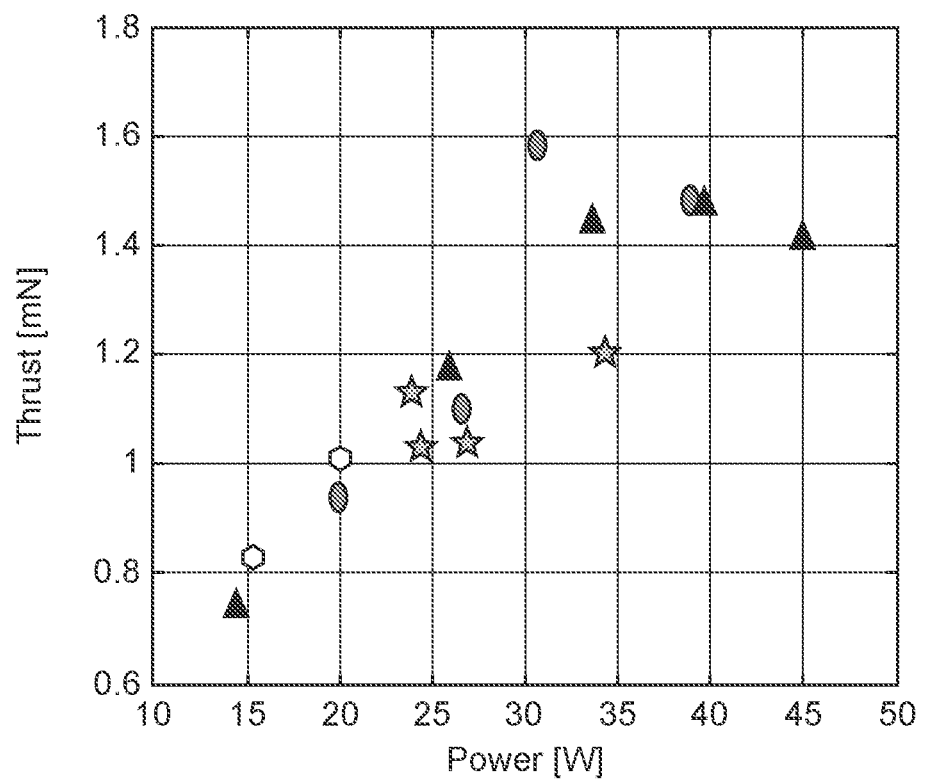

FIG. 3B displays the dependence of the thrust T on the power P for the three mass flow rates and the two magnetic field strengths of FIG. 3A. The figure seems to indicate a nearly linear dependence of the thrust on the power.

Figure 3C:
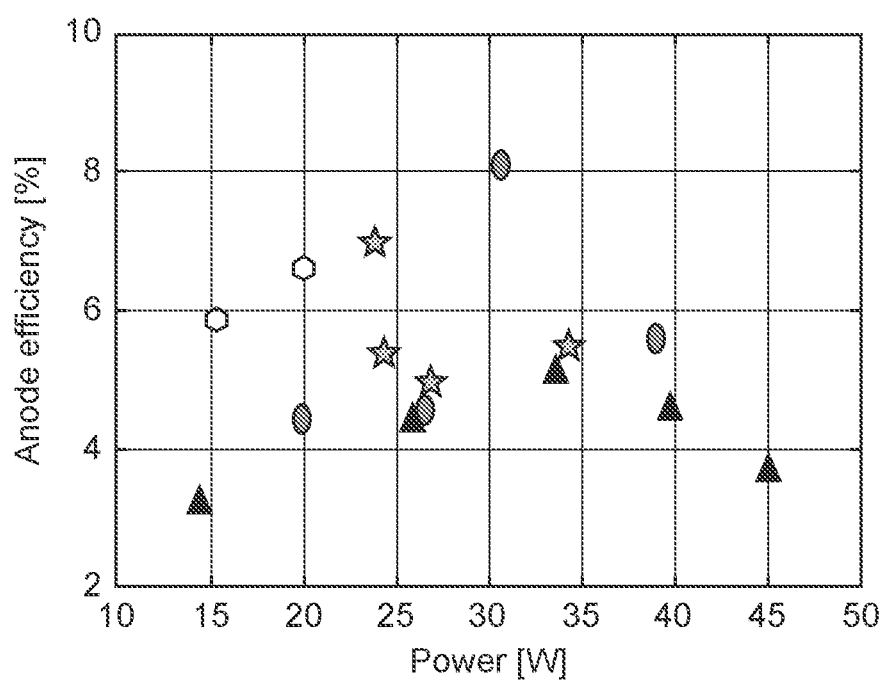

FIG. 3C displays the dependence of the anode efficiency $\eta_a = T^2/(2\dot{m}I_d U_d)$ on the power P for the three mass flow rates and the two magnetic field strengths of FIG. 3A. The figure seems to indicate that the anode efficiency may improve at lower mass flow rates.

Table 1 specifies favorable performance data of the prototype, which were (experimentally) obtained for three different sets of preset (controllable) operating parameters. The preset operating parameters included the mass flow rate, the discharge voltage, and the power. The measured performance data included the thrust, the discharge current, $I_{sp}$ (the exhaust velocity divided by the Earth's gravitational acceleration g), the anode efficiency, and the propellant utilization coefficient $\eta_p = \dot{m}_i/\dot{m}$ wherein $\dot{m}_i$ is the ion mass flow rate.

TABLE 1

Measured performance data of the prototype for three different sets of controllable operating parameters.

| | $\dot{m}$ [mg/s] | $U_d$ [V] | P [W] | T [mN] | $I_d$ [A] | $I_{sp}$ [s] | $\eta_a$ | $\eta_p$ |
|---|---|---|---|---|---|---|---|---|
| 1st parameter set | 0.38 | 85 | 15.3 | 0.85 | 0.18 | 230 | 0.059 | 0.276 |
| 2nd parameter set | 0.38 | 100 | 20.0 | 1.00 | 0.20 | 270 | 0.066 | 0.307 |
| 3rd parameter set | 0.50 | 87 | 30.4 | 1.60 | 0.35 | 320 | 0.081 | 0.364 |

As used herein, according to some embodiments, the terms "inner wall" and "inner channel wall" are interchangeable. Similarly, according to some embodiments, the terms "outer wall" and "outer channel wall" are interchangeable.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although steps of methods according to some embodiments may be described in a specific sequence, methods of the disclosure may include some or all of the described steps carried out in a different order. A method of the disclosure may include a few of the steps described or all of the steps described. No particular step in a disclosed method is to be considered an essential step of that method, unless explicitly specified as such.

Although the disclosure is described in conjunction with specific embodiments thereof, it is evident that numerous alternatives, modifications and variations that are apparent to those skilled in the art may exist. Accordingly, the disclosure embraces all such alternatives, modifications and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

What is claimed is:

1. A narrow channel Hall thruster comprising:
    a thruster body, and a neutralizing cathode positioned externally thereto and configured for electron emission, the thruster body comprising:
    a magnetic circuit comprising a magnetic field source and two annularly shaped magnetic poles;
    an annular thruster channel formed by the two annularly shaped magnetic poles and characterized by a first extremity having a first channel width, and a second extremity, downstream from the first extremity, and having a second channel width, the second channel width being less than 3 mm, and the first channel width being greater than the second channel width;
    an annular anode positioned in a vicinity of the first extremity of the annular thruster channel;
    a gas distributor configured to release a propellant gas into the annular thruster channel in a vicinity of the anode;
    wherein the magnetic circuit is configured to generate a magnetic field in the annular thruster channel, such that electrons are substantially confined therewithin; and
    wherein walls of the annular thrust channel are electrically biased with respect to the annular anode, to generate a substantially axial electric field along a length of the channel, at or in a vicinity of the second extremity of the annular thruster channel.

2. The narrow channel Hall thruster of claim 1, wherein the anode has at least one of:
    an anode width which is greater than the second channel width, or
    a mounting position perpendicular to an axial direction of the annular thruster channel, such that a surface of the annular anode which faces the first extremity of the channel, is substantially flat.

3. The narrow channel Hall thruster of claim 1 wherein the magnetic field generated in the annular thruster channel is substantially radial at or near the second extremity of the annular thruster channel.

4. The narrow channel Hall thruster of claim 1, wherein the magnetic circuit is further configured such that the magnetic field generated in the annular thruster channel increases in strength from the first extremity to the second extremity of the annular thruster channel.

5. The narrow channel Hall thruster of claim 1, wherein the thruster body further comprises a discharge chamber, which includes the thruster channel and which is fluidly coupled to an outside of the thruster body via the thruster channel, wherein the anode is positioned within the discharge chamber, and wherein the first channel width is smaller than a maximum width of the discharge chamber.

6. The narrow channel Hall thruster of claim 1, wherein the walls of the annular thruster channel are metallic, and configured to be maintained at a potential of the cathode or at an intermediate potential between the potential of the neutralizing cathode and a potential of the anode.

7. The narrow channel Hall thruster of claim 1, wherein the length of the annular thruster channel is no greater than 2 mm.

8. The narrow channel Hall thruster of claim 1, wherein the walls of the annular thruster channel comprise sloping sections along which a varying width of the channel decreases from the upstream channel width to the downstream channel width.

9. The narrow channel Hall thruster of claim 8, wherein the annular thruster channel comprises the sloping sections and a fixed-width section, the fixed-width section having a fixed section width comparable to that of the second width of the thruster channel, and extending axially from the sloping section.

10. The narrow channel Hall thruster of claim 1, wherein the annular anode is porous and forms a tip portion of the gas distributor, being thereby configured for release of the propellant gas into a discharge chamber.

11. The narrow channel Hall thruster of claim 1, wherein the second channel width is less than $\frac{1}{15}$ of a diameter of the annular channel at a center of the annular thrust channel.

12. The narrow channel Hall thruster of claim 1, wherein the second channel width is 2 mm or smaller.

13. The narrow channel Hall thruster of claim 2, wherein the anode width is at least 3 times the second channel width.

14. The narrow channel Hall thruster of claim 1, wherein the narrow channel Hall thruster has a diameter of less than 3 cm and wherein the narrow channel Hall thruster weighs less than 300 grams.

15. The narrow channel Hall thruster of claim 1, configured to operate under a potential difference of 100 V or less between the annular anode and the neutralizing cathode.

16. The narrow channel Hall thruster of claim 1, configured to operate at a power of 30 W or less.

17. The narrow channel Hall thruster of claim 1, wherein the thruster body has an insulator coating.

18. The narrow channel Hall thruster of claim 1, wherein the propellant gas is xenon, krypton, iodine, argon, or a combination thereof.

19. The narrow channel Hall thruster of claim 1, wherein the neutralizing cathode is any one of a thermionic cathode, a hollow cathode, a field emission cathode, or a radiofrequency/microwave cathode.

20. A method of operating a narrow channel Hall thruster of claim 1 at a low power, the method comprising the steps of:

powering said narrow channel Hall thruster using a power supply of 30 W or less;

establishing a discharge voltage across the neutralizing cathode and the annular anode so as to induce a closed-electron drift in the annular thruster channel; and releasing a propellant gas into the thruster channel, so as to produce a plasma by collisions with closed-drift electrons, wherein ions of the plasma accelerate downstream therein and exit via a channel exit, thereby inducing a discharge producing a thrust at a thrust-to-power ratio of at least 50 µN/W.

21. The method of claim 20, wherein the step of establishing the discharge voltage comprises a first sub-step of establishing an initial voltage to ignite the discharge, and a second sub-step, following a step of releasing the propellant gas, of lowering the initial voltage to obtain the discharge voltage.

22. A nanosatellite, comprising:

a satellite body portion;

a narrow channel Hall thruster according to claim 1; and a power supply for powering the narrow channel Hall thruster.

\* \* \* \* \*

UNITED STATES PATENT AND TRADEMARK OFFICE
CERTIFICATE OF CORRECTION

PATENT NO. : 11,781,536 B2
APPLICATION NO. : 16/770071
DATED : October 10, 2023
INVENTOR(S) : Igal Kronhaus and Abraham Warshavsky It is certified that error appears in the above-identified patent and that said Letters Patent is hereby corrected as shown below:

On the Title Page

Item (54) and in the Specification Column 1, Lines 1-2:
The words "IGNITION PROCESS FOR" should be deleted from the title Signed and Sealed this
Twelfth Day of December, 2023

Katherine Kelly Vidal
*Director of the United States Patent and Trademark Office*